United States Patent
Meng et al.

(10) Patent No.: US 10,303,539 B2
(45) Date of Patent: May 28, 2019

(54) AUTOMATIC TROUBLESHOOTING FROM COMPUTER SYSTEM MONITORING DATA BASED ON ANALYZING SEQUENCES OF CHANGES

(71) Applicant: INTERNATIONAL BUSINESS MACHINES CORPORATION, Armonk, NY (US)

(72) Inventors: Fan Jing Meng, Beijing (CN); Vadakkedathu T. Rajan, Yorktown Heights, NY (US); Mark N. Wegman, Yorktown Heights, NY (US); Jing Min Xu, Beijing (CN); Lin Y. Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 38 days.

(21) Appl. No.: 15/049,855

(22) Filed: Feb. 22, 2016

(65) Prior Publication Data

US 2016/0246662 A1    Aug. 25, 2016

Related U.S. Application Data

(60) Provisional application No. 62/119,415, filed on Feb. 23, 2015.

(51) Int. Cl.
G06F 11/34      (2006.01)
G06F 11/07      (2006.01)
(Continued)

(52) U.S. Cl.
CPC ........ *G06F 11/079* (2013.01); *G06F 11/0709* (2013.01); *G06F 11/0751* (2013.01); (Continued)

(58) Field of Classification Search
CPC ...... G06F 11/34; G06F 11/3438; G06F 11/30; G06F 11/3003; G06F 11/3058; (Continued)

(56) References Cited

U.S. PATENT DOCUMENTS 6,880,107 B1 * 4/2005 Kraft, IV ................ G06F 11/08 713/2
7,464,068 B2 12/2008 Fan et al.
(Continued)

OTHER PUBLICATIONS

Anonymously, "A Method and System to Manage Configuration Drift and Remediation," IP.com Electronic Publication: Sep. 30, 2010, p. 1-7.
(Continued)

*Primary Examiner* — Joseph O Schell
(74) *Attorney, Agent, or Firm* — F.Chau & Associates, LLC

(57) ABSTRACT

A method for automatically detecting and diagnosing problems in computer system functioning includes determining changed objects from computer system monitoring data, calculating temporal correlations from errors and changes sequences for each changed object, identifying and ranking suspicious computer system behavior patterns from the temporal correlations, and outputting said ranked suspicious computer system behavior patterns.

9 Claims, 5 Drawing Sheets

(51) Int. Cl.
  *G06F 21/55* (2013.01)
  *G06F 11/30* (2006.01)
(52) U.S. Cl.
  CPC ...... *G06F 11/0757* (2013.01); *G06F 11/0787* (2013.01); *G06F 11/34* (2013.01); *G06F 21/552* (2013.01); *G06F 11/3058* (2013.01); *G06F 11/3065* (2013.01); *G06F 11/3072* (2013.01); *G06F 11/3075* (2013.01); *G06F 11/3079* (2013.01)
(58) Field of Classification Search
  CPC ............. G06F 11/3065; G06F 11/3072; G06F 11/3075; G06F 11/3079; G06F 11/079; G06F 11/0787; G06F 11/0751
  See application file for complete search history.

(56) References Cited

U.S. PATENT DOCUMENTS

| | | | |
|---|---|---|---|
| 7,603,222 B2 | 10/2009 | Wiseman et al. | |
| 7,698,545 B1* | 4/2010 | Campbell | G06F 8/60 709/221 |
| 2004/0260678 A1* | 12/2004 | Verbowski | G06F 11/008 |
| 2005/0138111 A1* | 6/2005 | Aton | G06F 11/3476 709/201 |
| 2008/0098094 A1* | 4/2008 | Finkelstein | G06F 9/4411 709/220 |
| 2011/0055138 A1* | 3/2011 | Khanduja | G06F 11/30 706/47 |
| 2013/0006987 A1* | 1/2013 | Stevenne | G06F 11/079 707/737 |
| 2013/0166967 A1* | 6/2013 | Jerde | G06F 11/30 714/48 |
| 2013/0227352 A1* | 8/2013 | Kumarasamy | G06F 11/3072 714/47.1 |
| 2016/0019134 A1* | 1/2016 | Periyasamy | G06F 11/3664 714/38.1 |
| 2016/0026510 A1* | 1/2016 | Furtwangler | G06F 9/466 719/318 |
| 2016/0055044 A1* | 2/2016 | Kawai | G06N 99/005 714/26 |
| 2016/0217022 A1* | 7/2016 | Velipasaoglu | G06F 11/079 |

OTHER PUBLICATIONS

Sai Kiran Mukkaville, et al., "Mining Concept Drifting Network Traffic in Cloud Computing Environments," 2012 12th IEEE/ACM International Symposium on Cluster, Cloud and Grid Computing.
Software Patent Institute, et al., "Stochastic Catastrophe Theory in Computer Performance Modeling," IP.com Electronic Publication, Mar. 30, 2007, pp. 1-66.

* cited by examiner

AUTOMATIC TROUBLESHOOTING FROM COMPUTER SYSTEM MONITORING DATA BASED ON ANALYZING SEQUENCES OF CHANGES

CROSS-REFERENCE TO RELATED APPLICATIONS

This U.S. non-provisional patent application claims priority from "Automatic Troubleshooting", U.S. Provisional Patent Application No. 62/119,415 of Meng, et al., filed on Feb. 23, 2015, the contents of which are herein incorporated by reference in their entirety.

TECHNICAL FIELD

Embodiments of the disclosure are directed to measuring computer system behavior to monitor computer system performance and to maintain the computer system.

DISCUSSION OF THE RELATED ART

A computer system typically starts in a desired state and then changes its states over time due to daily execution, maintenances, and updates. Some changes evolve the desired state into another state, but other changes can introduce challenges to the computer system. System/application failures are prevalent in information technology (IT). Most famous systems, such as Microsoft Azure, Amazon. com, Amazon EC2, Facebook, Twitter, etc., have all experienced outages which affected millions of their customers. For example, it is estimated that every system/application failure has cost Amazon over $66K per minute for website outage. Mis-configured systems/applications and their environments are the primary reasons for application/service-level performance issues and even outages.

However, it is challenging to identify problematic system changes in troubleshooting, because the changes would happen at different levels, which needs domain knowledge to analyze them. These changes include OS changes, such as kernel upgrades and patches, package changes, middleware changes, application changes, and network connection changes. In addition, the amount of data to be analyzed data is huge. For example, just for middleware configurations, WebSphere Application Server V8.5 has 900+ configuration files and 1,152 pages of administration and configuration guide, and Oracle 10 g DBMS has 220 initialization parameters and 1,477 tables of system parameters, along with a 875-page Administrator's Guide.

Existing approaches can be classified into two categories: (1) a trial-and-error approach: in which a system administrator logs into the systems and tries to identify the root causes based on their experiences and symptoms, as recorded in logs and traces; and (2) a tool assistant approach, in which tools, such as Splunk, Evolven, TripWire, etc., allow system administrators to specify the rules to monitor file/directory changes, configuration items, etc. However, both approaches have shortcomings. The former depends on human experience and knowledge, while the latter challenges system administrators to specify all the inspection rules.

Automatic problem detection has been studied, but despite some success has not made a significant impact on the practices of the IT industry. Yet at the same time the IT industry spends billions of dollars finding and fixing problems. Many of those problems are coding errors, but a substantial portion are operations errors.

In addition, the paradigm of how systems are developed and deployed is changing in a way that demands new mechanisms. People are deploying smaller units of functionality, which may help enable techniques like delta debugging, which are based on recognizing which set of changes that were made were faulty. Making all changes in a single functional unit does not help isolate anything. In addition, programs are being composed from a large variety of services and those services are often outside the control of the person composing them together. If one of those services changes, that can cause a problem and the composer may be unaware that anything has even changed. So, DevOps may complicate some problem determination at the same time dt brings greater functionality and agility.

While ideally it should be possible to find the exact line of code or configuration file that caused a problem, even knowing which person or team is likely to be responsible or able to fix it would be helpful. Coming up with a list of candidate problems that are derived in a way that humans would not derive will be useful to humans who can discard some list items because they are obviously wrong from a human reasoning point of view. Ultimately some dialog between a human and a computer to determine the problem may be the best solution.

Studies have shown that most problems are introduced after the system starts executing, and it will be assumed that the system was in a good state to begin with, something changed and it now is in a bad state. The words "potential cause" is used to mean something that is likely to have manifestations later. For example, if a picture file is not copied to the right location, many web pages may lack that picture. The lack of copying may be considered a cause of the problem, and the fact that a web page doesn't show the picture is a symptom of the problem. Symptoms and causes can form chains, for example, a change in a program might result in the program using too much memory. The program change is the cause, the use of memory is a symptom. But too much memory is being used, the program may eventually run out of memory. Running out is a symptom of using too much memory. Because the program ran out of memory, a picture file may not be copied into a location that is full, etc. So what is a cause and what is a symptom is a matter of perspective. Note that after a picture file is not copied, some, but not all pages will be missing the pictures. Only those pages which attempt to display the particular missing picture will be defective. A change in a program may or may not be correct. That change may be referred to as a candidate for a cause if it is suspected that it might be the cause.

SUMMARY

Exemplary embodiments of the disclosure provide systems and methods for determining what changes in a computer system caused a problem and what symptoms there are that can only happen because that change occurred.

According to an embodiment of the disclosure, there is provided a method for automatically detecting and diagnosing problems in computer system functioning, the method including determining changed objects from computer system monitoring data, calculating temporal correlations from errors and changes sequences for each changed object, identifying and ranking suspicious computer system behavior patterns from the temporal correlations, and outputting said ranked suspicious computer system behavior patterns.

According to a further embodiment of the disclosure, determining changed objects from the computer system monitoring data and extracting error sequences and change sequences from said changed objects comprises obtaining all changes in the diagnosis time window, identifying a list of changed objects, and extracting errors and change sequences from the list of changed objects.

According to a further embodiment of the disclosure, the method includes removing irrelevant pattern changes, such as change behavior patterns and change sequence patterns.

According to a further embodiment of the disclosure, changes include file/directory changes, package changes, operating system configuration changes, and network service changes.

According to a further embodiment of the disclosure, features further include change frequencies and change densities.

According to a further embodiment of the disclosure, calculating temporal correlations between problematic behaviors and changes for each changed object comprises obtaining the time of an error or performance anomaly from the computer system monitoring data, filtering changes by narrowing the input time window using the error time, and for each changed object, fusing errors with change sequences to generate a change-error sequence, and extracting temporal correlations between errors from the change error sequence.

According to a further embodiment of the disclosure, identifying and ranking suspicious computer system behavior patterns from the temporal correlations comprises discovering normal changes and abnormal behavior patterns from the change error sequences, calculating confidence levels of the normal changes and abnormal behavior patterns from the extracted features to identify suspicious behavior patterns and ranking identified suspicious behavior patterns.

According to a further embodiment of the disclosure, the method includes receiving an input of a time window of the computer system monitoring data to be diagnosed; and extracting errors and changes sequences from said changed objects.

According to another embodiment of the disclosure, there is provided a system for automatically detecting and diagnosing problems in computer system functioning, including a feature extraction module that extracts features, including change frequencies and change sequences, of changed objects from change records of computer system monitoring data of a computer system, a data cleaning module that removes irrelevant changes based on domain independent rules or patterns, wherein irrelevant changes include adding a new file, accessing a file, and frequently changed objects, a drift annotation module that identifies suspicious computer system behavior patterns using normal and abnormal patterns, and a ranking module that calculates confidence levels of the identified suspicious behavior patterns and ranks said suspicious behavior patterns.

According to another embodiment of the disclosure, there is provided a non-transitory program storage device readable by a computer, tangibly embodying a program of instructions executed by the computer to perform the method steps for automatically detecting and diagnosing problems in computer system functioning.

DETAILED DESCRIPTION OF EXEMPLARY EMBODIMENTS

Figure 1:
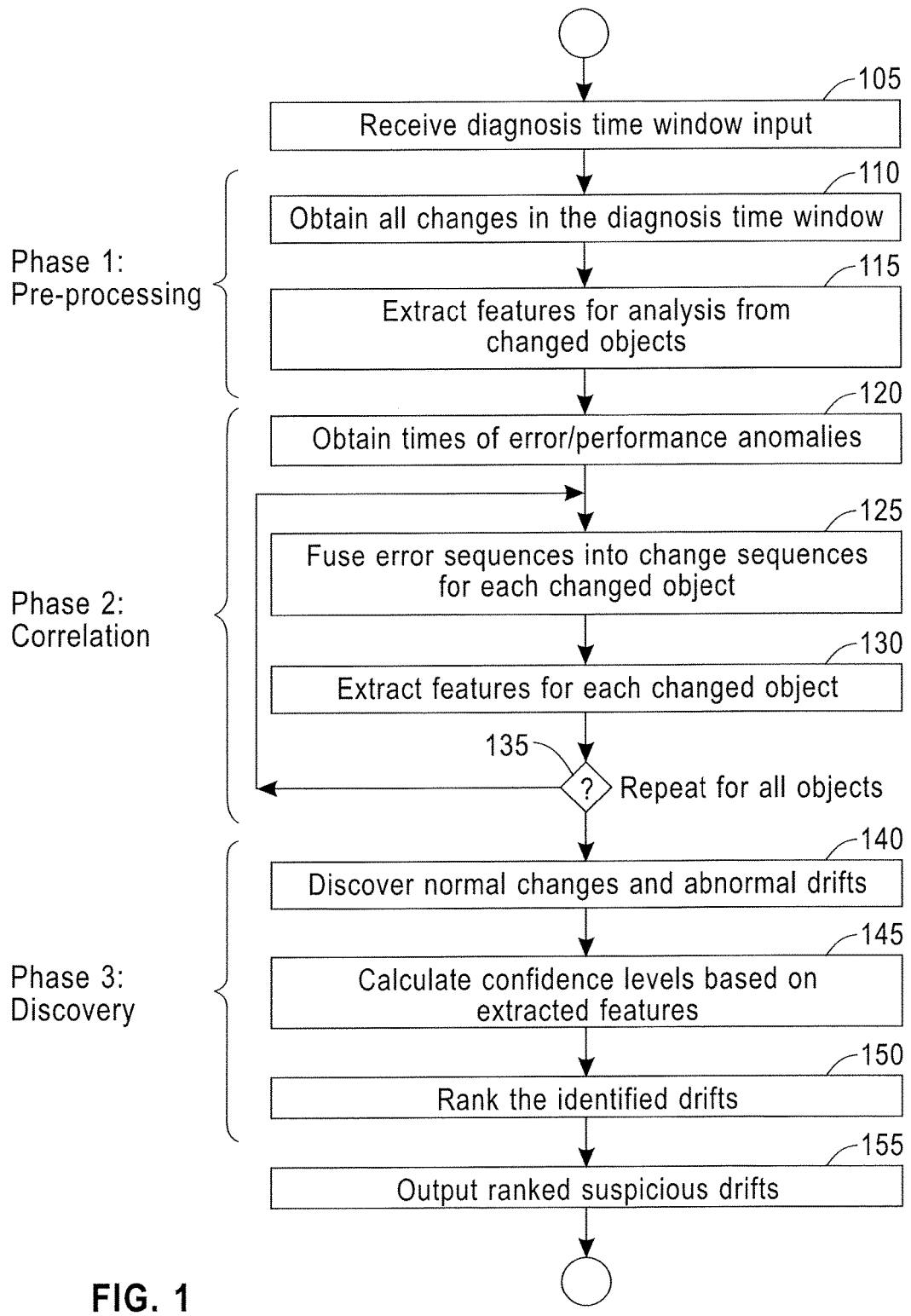
FIG. 1 is a flowchart of an automatic diagnosis process according to an embodiment of the disclosure.

Exemplary embodiments of the disclosure as described herein generally include methods for automatically troubleshooting performance issues in computer systems. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. In addition, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

According to embodiments of the disclosure, there are at least four independent ways to assign probabilities to potential candidates: (1) temporal reasoning; (2) reasoning from detection of an error; (3) reasoning from hitting capacity limits; and (4) reasoning from user feedback. These probabilities may be combined to form a probabilistic list of which candidates are most likely to be that cause. A recent change is more likely to be the cause of a problem than one that has been there longer. Changes that are only active when a problem occurs are also more likely to be relevant. Unusual changes are more likely to be the cause of a problem. Certain kinds of changes can cause certain kinds of errors.

A problem can be reported either by humans calling on a phone, sending email or otherwise signaling that they are unhappy with a system. It can also be reported by a system that monitors what is working and what is not working, or it can be determined from error logs, etc. When a problem is reported, an estimate can be made of when the actual problem occurred if there is lag between the occurrence and the report. Embodiments of the disclosure are directed to determining as accurately as possible when the reported symptom occurred.

Temporal Reasoning

Many symptoms will occur with a Poisson arrival time after their cause occurs. Some may appear with a higher frequency after the cause but also appear beforehand. For example, if a web page on a system is deleted, whenever that page is searched for, Apache may log a 404 error. However, whenever a user mistypes a URL and there is no such URL, then Apache will be logging 404 errors before the file was deleted. In this case 404 errors appear with different Poisson distributions before and after the cause. Note that the interval may be defined not in terms of time, but rather in terms of events. So it may be that people tend to access a system more between 9 am to 10 am than between 2 am to 3 am. In this case there is a certain percent of 404 errors per 1000 page uses rather than per hour.

If there are two or more symptoms, $s_1, s_2, \ldots$, of a problem and the symptoms are assumed to occur only after their cause, the average interval, a, between symptoms can be found. Going back from the time of the first symptom by the interval a will yield the mean of the expected time the cause occurred. According to an embodiment, the first symptom is said to have occurred at time $s_1$. Intuitively, like a half life going backwards in time, the first symptom would be expected to appear with a reasonable probability within interval a of the cause. The odds of the cause being in the previous interval are the same probability times (1 minus that probability) because there can only be one cause. Formally it can be proven from this type of temporal reasoning that the probability of a given candidate that occurs at time t is the cause is $\exp((s_1-t)/a)$. More complicated formulae are appropriate if some symptoms occur before the cause because there may be a background level occurrence of symptoms even without the cause of the increased frequency of the symptoms.

If two potential causes occurred at times $t_0$ and $t_1$, respectively, then the ratio of their probabilities of being the actual cause would be $p(t_0)/p(t_1)=\exp((t_1-t_0)/a)$.

If only one symptom has occurred, the type of symptom, e.g. a software crash, a user report, a log message etc., can be used along with historical information to find the typical interval between the cause of such a problem and substitute that for a in the above formula. However, even without using historical data, there must be some decrease in probability with increasing time from the single symptom at time $s_1$. There is a probability distribution for how many bugs show their first symptom over time and that distribution sums to 1. If the probability declines only linearly with time the distribution would sum to infinity, so it must decline faster than that. Suppose two candidates causes appear at times c and c', both before the symptom at time $s_1$. Then $p(c)/p(c')<(c'-s_1)/(c-s_1)$ because the decline must be more than linear. If it were to decline quadratically, it would be $p(c)/p(c')=((c'-s_1)/(c-s_1))^2$.

Understanding when a Change is Observable

Some executions cannot see that a change has occurred. For example, suppose that there has a change of the permissions of a file. Then, if a symptom shows in the run of a program which does not read, execute or list that file, then it is unlikely that the change of permissions can be seen during that run. Since the symptom appeared in a run unaffected by the permissions change, it is unlikely that the permissions change is the cause of the symptoms. Similarly, if a change is rarely observable, but when the change is observable, the symptom often occurs, then the estimate of the probability that the change is responsible should increase.

The previous section assumed symptoms can appear many times with a Poisson arrival time distribution after a change occurs. This section discusses observations with the property that each observation precedes at most one symptom.

What is observable is a tricky issue. Obtaining inexpensive instrumentation to accurately reflect some abstract definition of observable may be challenging. However, changes that are observable may only create a problem part of the time, and not all problems are reported. So, a mathematical model should tolerate cases where an observation is not a symptom of a problem. However, according to an embodiment, it can be assumes that the occurrence of a symptom is an observation of a potential cause.

Debugging a program often involves inserting print statements to help determine where in the execution a bug arose. According to an embodiment of the disclosure, print statements are inserted automatically so that an observation can be correlated with a problem, and to combine the reasoning of the previous section with that of this section.

It has been shown that if rarely executed paths can be instrumented in a program, and if these rarely executed paths occur correlated with errors, then it can be determined that those paths are likely the cause of the problem. Automatic instrumentation can be more rigorous than doing so by hand. In addition to rarely executed paths, network traffic can be instrumented.

For example, suppose there is a symptom that starts appearing frequently enough to conclude that its cause was recently introduced. If there are two candidates for this cause that were made at the same time, the previous mechanisms cannot distinguish between them. Moreover, suppose there are several independent runs of a program. If there is a run where a symptom occurs and only one of those candidates is observable, the other candidate can be eliminated from contention. An analysis starts by assuming both candidates are equally likely. If one candidate cause occurs much more often and there are several symptoms, then it would be unlikely that the other candidate cause would be present every time the symptom appears. If both candidates are observable for all x times there is a symptom but one is observed y times more than the other even when there is no symptom, then from Bayes' theorem it can be concluded that the less frequently observed candidate is $y^x$ times more likely the cause.

As another example, consider a case when there are no independent runs by looking at the delay between the potential cause and the symptoms. Intuitively, for many bugs, once a bug is triggered some additional actions take place, and then the impact of the bug is observed. There will be some variance in the delay of those actions, but the delay would be the sum of the variance of those actions, and many times it would have a Gaussian distribution. An average time delay can be computed for any given set of symptoms and set of candidate instances from the nearest candidate to a symptom and the standard deviation of those delay times. It can be shown that for multiple symptoms, a small standard deviation may be even more telling than a smaller time gap. Since the variance is probably going to be related to the amount of delay, the log-normal standard deviation can be used. For example, if an observation has to reach some place in a network before a problem occurs, and some further observations would be made, the amount of jitter in the arrival time would be expected to be roughly proportional to the network distance travelled.

Just as above, for any given cause there will be some expected amount of time from its observation to the appearance of a symptom. By considering the ways to assign each type of bug a probability that it will on average take time L before a symptom occurs, it can be shown that the likelihood that it will take time L for a symptom to appear is less than 1/L.

In the independent run example above, multiple examples yield an exponential improvement. But a longer delay between one candidate and another suggests the shorter delay candidate is the more likely, but it does not become more likely when there are repeated symptoms and observations. Bugs with longer delays are less likely, but they will always have longer delays and repetition does not further differentiate the candidates. However, considering the variance of delays is substantially equivalent to the differentiating power of the independent run example.

Some Definitions

Suppose there is a time line that goes from time $t_1$ to time $t_2$, a set of symptoms that occur at times $s_1, s_2, \ldots, s_n$, and a set c of candidate causes that occur at times $c_1, c_2, \ldots, c_n$. Then the average delay between the symptoms and the causes is $$d = \frac{1}{n}\sum_{i=1}^{n}(s_i - c_i).$$

The standard deviation of cause and symptom after delay is $$\sigma = \sqrt{\frac{\sum_{i=1}^{n}(s_i - c_i - d)^2}{n}}.$$

Let $x_i = s_i - c_i$. Then the standard deviation can be rewritten as:

$$\sigma\sqrt{n} = \sqrt{\sum_{i=1}^{n}(x_i - d)^2}$$

and $$d = \frac{1}{n}\sum_{i=1}^{n}x_i.$$

There is a geometric interpretation of that last equation: $\sigma\sqrt{n}$ is the radius of a ball centered at $(d, d, \ldots)$.

The quality of a match between a set of potential causes and symptoms should decrease as a function of delay and should also decrease as the standard deviation of the delay increases. With only one point for cause and effect, the standard deviation is zero. Each additional point should, with low deviation, bring more positive evidence about the pairing. Since the quality decrease must be more than linear, and in fact more than n log(n), according to an embodiment of the disclosure, it will be assumed to be quadratic. So, according to an embodiment of the disclosure, a metric of the quality of a candidate set of causes c is $$q_c = \frac{1}{\sigma^{n-1}d^2} = \sigma^{1-n}d^{-2}.$$

For some set of points to be a candidate set of causes, they must all precede the symptoms. In fact to be plausible, they must precede the symptoms by at least 1 standard deviation.

One question to consider is to ask is for a random set of points c', and a random alignment with the symptoms with quality $q_c'$, what is the probability that $$q_{c'} = \sigma'^{1-n}d'^{-2} \geq \sigma^{1-n}d^{-2} = q_c,$$

where $\sigma'$ and $d'$ are the standard deviation and average delay for c' and s. Thus, $\sigma' \leq (q\, d'^2)^{1/(1-n)}$. Since $1/(1-n)$ is negative for n greater than 1, as $d'$ grows, $\sigma'$ must decrease.

This is similar though more complex than asking how large is the ball above compared to the whole space. Some problems only occur if two changes interact, in which case they can both be thought of as causes. Thus, it is undesirable to show the best candidate. Rather, according to embodiments of the disclosure, all candidates should be shown that are significantly more likely than random points to be causes. If there are 100 potential causes, the likelihood of a quality metric that is that good should be less than $\frac{1}{100}$ on a random set of points before selecting a candidate. For a random set of points c' to be a potential set of causes for a set of symptoms s, the causes must precede the symptoms and that implies that the standard deviation of the delays will be less than the average delay. Thus, all points that can be a set of causes fits in a hyperdimensional cone whose radius at any point is less than the height of the cone plus a cap where the radius shrinks quadratically. Since the cap is less than the cone, the total volume is less than that of two cones. The volume of a cone of radius r is less than $\pi^3 r^n/6n$. Thus, the whole volume is significantly less than $\pi^3 q^{1+n}/3n$. The volume in which this capped cone resides is an n-dimensional cube whose sides are the length of time the program has run. However, for a set of $m \geq n$ points, the number of alignments is $$\binom{m}{n}$$

n! of in possible symptoms. So as m increases, the probability increases that a random alignment will be of high enough quality. Thus, according to an embodiment of the disclosure, to enable a set of causes larger than the number of symptoms, the above quality should be divided by $$\binom{m}{n}$$

when testing for statistical significance. There is no need to divide by n! since that will be the same for all sets of causes as the number of symptoms remains the same.

The above works well on the assumption that any potential cause will occur at least as often as the symptoms. However, it is entirely possible that there may be one or more potential causes within a group that do not cause a symptom to occur. For example, a method may only fail on some inputs but not all inputs. Nevertheless, that method may correspond to what may be considered a cause. Similarly, a piece of code may cause frequent failures, but if those failures result in bad pages shown to a user, not all of the causes will cause the user to complain. However, in a metric according to an embodiment of the disclosure, if there is a symptom without there being a nearby potential cause within a group of potential causes, the group will be eliminated from contention. So in building a definition of observability, an embodiment should err on the side of something being observable if there is uncertainty about whether the something has been observed.

According to embodiments, multiple causes are allowed to achieve statistical significance. It may be that two observables occurring together are actually a cause of a problem. It may also be that one of the observables is a proximate cause and the other a root cause. In the context of proximate and root causes, there should be statistical significance in the question, treating one set of observables as a symptom that occurs later, whether the other set is potentially a cause.

Normality of the Change

Certain types of changes are more likely to cause problems than others. According to embodiments of the disclosure, a combination of some initial assumptions and learning within a given system can be used to learn the likelihood that certain changes will cause problems. Initially, statistics are used about how often changes are likely to cause a problem. For files written by programmers for the system, an initial estimate is 10 bugs per KLOC (1000 lines of code), and the actual statistics for the system and its programmers can be learned over time. Changes in configuration files may be similar. Updates to purchased programs are perhaps of lesser concern but still a concern. For example, the odds that a change to Windows will interfere with a particular program, assuming it is not a version change that changes user APIs, are low because Windows is extensively tested before being released, though there are certainly bugs remaining. Other types of files are even less likely to cause problems. If a program writes a file, it is unlikely to cause a change but it is not impossible. If the system has run for a while and there have been a number n changes in the past without causing problems, it may be reasonable to conclude that this type of change will cause a problem less often than 1/n.

According to embodiments of the disclosure, there are different types of changes. For example, there can be a type for (1) code changes, (2) config file changes, (3) updates to systems that are broadcast by their provider, and perhaps all other types of changes. For code, if there is access to the source repository, the number of lines of code can be counted rather than the number of changes checked in. Bugs per KLOC has been extensively studied and seems to be more predictive of bugs than any other studied metric. While there are concerns about how accurate it is in the context of modern programs that are compositions of other systems, there are no good empirical studies that suggest a better alternative. The number of lines of code changed in config files can also be counted. For updates, the simplest count of changes is the number of updates. According to embodiments, version changes can be counted as different from bug fixes, e.g. if there is an installed release x.y and it changes to x+1.y, that is a different type of change than updating to x.y+1, so category 3 becomes two different categories. For category 4, either number of files changed or their size can be counted.

According to embodiments of the disclosure, Laplace smoothing can take into account an initial assumption about error rates with learning about the actual error rates. In Laplace smoothing, there is a prior assumption about the overall bug rate, call it o, and some number of observations of a running program, r, with some number of those having trouble, t. Then Laplace smoothing would choose a constant k, and evaluate $$\frac{k \times o + t}{k + r},$$

as the learned likelihood that after the r'th run there will be a bug on any given run. According to an embodiment, k should be chosen so that k×o>>1. For any given type of change, there can be an overall view based, for example, on other systems or other parts of this system, and then details that pertain to this local situation can be learned. In Laplace smoothing, the left side of the fraction is fixed, and as the right side accumulates more information the right side will dominate, but until there is enough local information the overall figures dominate. According to embodiments, for code changes, o would be $\frac{1}{100}$, k would be $>>10^2$, e.g., $>10^4$, r would be the number of lines of code that have changed, and t would be the number of distinct bugs reported in those lines.

According to embodiments, Laplace smoothing can be applied recursively. A team may have an error rate that deviates from the overall programmer norm. Thus, there can be an overall error rate for an enterprise, $o_e$, and an overall rate for a team, $o_t$. Then $$o_t = \frac{k_e o_e + t_t}{k_e + r_t},$$

where $k_e$, $t_t$, $r_t$ are the constant for the enterprise, the errors the team has made, and the overall runs for the team, respectively. Then $o_t$ can be used to smooth the individuals errors.

Sometimes code is moved from one place to another, in particular when updates are issued, or sometimes a service is changed by a vendor. The new code or service can create a problem for old code. From a philosophical point of view it may be that old code was using the service incorrectly but did not notice, and it is ambiguous whether the bug is in the new code or was there all along. From a practical point of view, if the system points out that the problem was caused by the new version, most developers will understand quickly what needs to be done, so laying blame is irrelevant. In this case a vendor can be treated like a developer, except that it is not known how many lines of code went into the change. It can be recorded as a change and an overall prpbability can be assigned to problems caused by all developers. To do this recursively, there can be an overall problem rate for developers, a more specific problem rate for a specific developer, and if there is enough data, a problem rate for this particular release.

Even within an enterprise, if a component is created and is being rolled out to a number of teams that are using that component, this component rollout can be modeled in the same way code from a vendor would be modeled. Code that has passed a test team can be modeled differently than code that is just used before going to a test team.

Reasoning from the Detection of the Error

Humans reason first by asking what the symptom of an error is, rather than when did the symptom occur. Clearly that is powerful information. It is also more challenging to teach a computer how to reason that way, and it may be good if a human reasons differently than a computer so long as there can be a useful dialog between them when an error occurs. That dialog is usually called a user interface. However, the computer can be taught some elementary types of reasoning for common types of errors that are detected. Problems can be categorized by their reporting methodology. Missed SLA's and capacity problems, such as running out of disk space, account for a substantial percent of reported problems and those come well characterized. The remainder are largely made up of human reported problems, which are less so.

Reasoning from Hitting Capacity Limits

Hitting capacity limits in file directories accounts for approximately 10% of tickets generated on traditional systems. This may change on Cloud based systems, but many and perhaps most of these limits are in place to both hold down costs and to control against systems running wild. Many and perhaps most of the tickets generated are when some threshold, such as 80%, of a directory's limits are hit, rather than when files can no longer be stored in the directory. When these limits are hit often a human will compress some files, or move them to some other location. However threshold violations are also often thought to be false positives and no action is taken. For example, a large temporary file may have been added and then deleted before an operator even looks at the issue. Separating out the handling of this kind of issue into the two motivations, controlling cost and preventing uncontrolled usage of space, may enable lowering the human cost of dealing with these issues.

Exceeding a threshold is a surrogate for saying that the entire capacity of the directory will soon be exceeded. Embodiments of the disclosure can look at a current smoothed growth rate of space within a directory and at the variance from that smoothed rate. For example, using a three standard deviations standard, embodiments of the disclosure can estimate how long it will be before available memory is exceeded. That works if there has been no change to the system. Embodiments can also look to see if there has been a change and when that change is most likely to have occurred.

According to embodiments, automatic strategies can be used to keep costs down at least as effectively as human strategies. For example, it can be predicted how likely a file is to be read, based on its age and how recently it was examined. If a threshold is imposed along with an indication of which files in the directory can be compressed and/or archived, the OS can be more diligent about lowering space costs than humans can.

Reasoning from User Feedback

Parsing user complaints is challenging. One approach is to build automatic feedback mechanisms that gently ask people to report traceable information. For example, if a feedback button is provided on all pages, then it is easy to find where in the Apache log the web page was created that the user is complaining about. The user can be asked to circle the part of a picture of the page and explain their concern. If it can be determined which computations were involved in creating that part of the page, the set of updates to the system that are implicated can be limited. If the computation is performed via a stateless mechanism, techniques like Delta Debugging can be used to isolate which changes make an impact on those fields of the page. There may be other techniques that can tell when the backward slice from the part of the page reaches the forward slice from the change, but that can be challenging given that systems are now rarely written in just one language.

How to Combine the Various Kinds of Information

According to embodiments of the disclosure, formulas have been provided to compute the ratio of the probability of two changes being the cause of the symptoms based on four different types of reasoning. To combine them, the four ratios can be multiplied to obtain a combined formula. Doing this allows comparing any two potential causes to see which is most likely. The comparisons can be performed in order to find the most likely cause.

According to embodiments, thresholds for each types of reasoning can be learned from training data for a normal or abnormal change. Further, this reasoning can be codified into normal/abnormal patterns with learned thresholds. Finally, these normal/abnormal changes can be discovered against these normal/abnormal patterns on a set of testing data.

Other Reasoning

There is other reasoning that can also be used. For example, if there is a description of a symptom and a word in that description matches only a small number of potential causes, one could disqualify all the causes that do not match. According to an embodiment of the disclosure, if there is a score to determine how good the match is, then that score can be multiplied by the probability described earlier. Here is another example. The change type/behavior sequence of each changed object in a given diagnosis window can be extracted. Based on the extracted sequence, recurring change sequence patterns can be discovered, and its change frequency can be calculated. Similar as other reasoning, embodiments can learn a normal/abnormal threshold of change frequency for each change sequence pattern. Then, for each given change, there can be a score of the likelihood that the change matches a normal/abnormal pattern. This score can be combined with other probabilities described above.

Errors can also be detected by violating programming language rules, such as dividing by zero, referencing an array out of bounds, etc., violating operating system rules, such as attempting to change a file without the right permissions on the file, violation of some other application, such as attempting to access a URL that a web server does not know about, or a bad SQL string sent to a database, or any error message written into a log file by a programmer.

According to embodiments, the type of error reporting can be used to limit the scope of changes being considered. For example, if an error is reported in one process on one machine, then only changes visible to that process or to processes called by that process are potential candidates. Thus topology data can feed into this system.

Normal/Abnormal Patterns

According to embodiments of the disclosure, based on the different features of changes and their reasoning models to calculate the probabilities of these features, normal/abnormal patterns can be learnt from a set of training data. The patterns can be represented as a set of classifiers or rules, which can be applied to automatically identify the normal/abnormal changes.

Here is an example of abnormal configuration change sequence pattern which is specified by Semantics Web Rule Language (SWRL). It can also be represented with other languages or formats.

hasType(?c, "file change")∧hasChangeType(?c, "update_content")∧hasObjType(?c, "config file")∧hasChangeSequence(?c, "UM[A]")∧hasChangeErrorSequence(?c, "UM[AE]")∧hasMinTemporalDist2Err(?c, xsd:integer[>=0] or xsd:integer[<=2.3e4])→hasTag(?c, "detected by change sequence pattern")

This rule defines that if the changes are on the file, the change type is "update content", the type of changed object is "config file", its change sequence presents the pattern "UM[A]", its change-error sequence matches "UM[AE]", and the minimal temporal distance of change in sequence with the error is bigger than 0 and less than 2.3e4, then the change is a suspicious cause of the given error and will be labeled with the tag "detected by change sequence pattern".

Processes

FIG. 1 is a flowchart of an automatic diagnosis process according to an embodiment of the disclosure. A process according to an embodiment of the disclosure includes three phases: a pre-processing phase that determines changed objects from computer system monitoring data and extracts features from these objects, a correlation phase that calculates temporal correlations between problematic behaviors and changes for each changed object by applying the correlation analyses and pattern-based approaches according to embodiments discussed above, and a discovery phase that identifies and ranks suspicious computer system behavior patterns, again, using the correlation analyses and pattern-based approaches according to embodiments discussed above. Referring now to the flowchart, a diagnosis process begins at step 105 by receiving an input of a time window $[t_0, t_n]$ of computer system monitoring data to be diagnosed. A pre-processing phase according to an embodiment begins at step 110 by obtaining all changes in the diagnosis time window. These changes may include file/directory changes, package changes, operating system configuration changes, network service changes, etc. At step 115, a list of changed objects is identified, and features are extracted from the objects for analysis. These features may include change sequences, error sequences, change frequencies, and change densities. In addition, irrelevant pattern changes, such as change behavior patterns and change sequence patterns, can be removed. A correlation phase according to an embodiment begins at step 120 by obtaining the time $t_e$ of an error or performance anomaly from, for example, the error log of the computer system monitoring data. Changes can be filtered by narrowing the diagnosis window from $[t_0, t_n]$ to $[t_0, t_e]$ using the error time $t_e$. Then, for each changed object, the error sequences are fused, at step 125, with the change sequences to generate a change-error sequence, and features are extracted for each changes object, at step 130. The features may include, for example, the temporal correlation between errors. Steps 125 and 130 are repeated from 135 for all objects.

Figure 2:
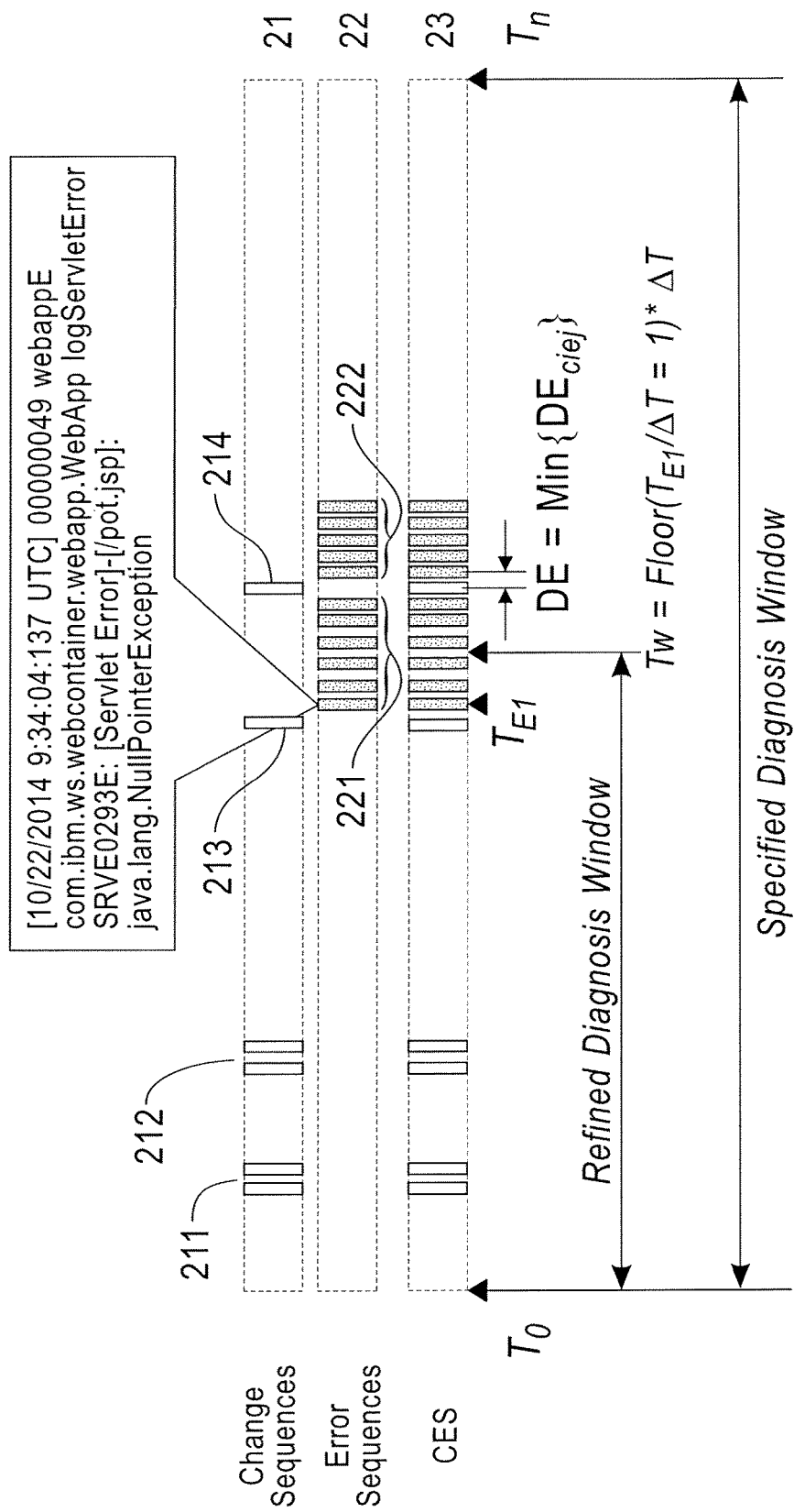
FIG. 2 illustrates a process of correlating with errors, according to an embodiment of the disclosure.

FIG. 2 illustrates a process of correlating with errors, according to an embodiment of the disclosure. FIG. 2 shows a pattern of change sequences 21, with changes or groups of changes 211, 212, 213, 214 over a specified diagnosis time window $[T_0, T_n]$, a pattern or error sequences with error sub-sequences 221 and 222 over the specified diagnosis time window, and a combined change-error sequences 23. A time of the first error in error sub-sequence 221 is $T_{E1}$, which is used to specify a refined diagnosis window $[T_0, T_W]$, where $T_W = \text{Floor}(T_{E1}/\Delta T + 1) \times \Delta T$, where $\Delta T$ is a time interval for scanning changes in the system, set by a change collector, and a minimum time from a change to an error occurrence is indicted by $D_E$, the temporal distance of a change $C_i$ to an error $E_j$.

A discovery phase according to an embodiment begins at step 140 discovering normal changes and abnormal drifts based on the changes error sequences. The confidence levels of these normal changes and abnormal drifts can be calculated from the extracted features, at step 145, and the identified drifts are ranked at step 150. The ranked suspicious drifts are output at step 155. In other embodiments of the disclosure, the identified drifts may be associated with remediation actions, which may also be output with the ranked suspicious drifts.

Figure 3:
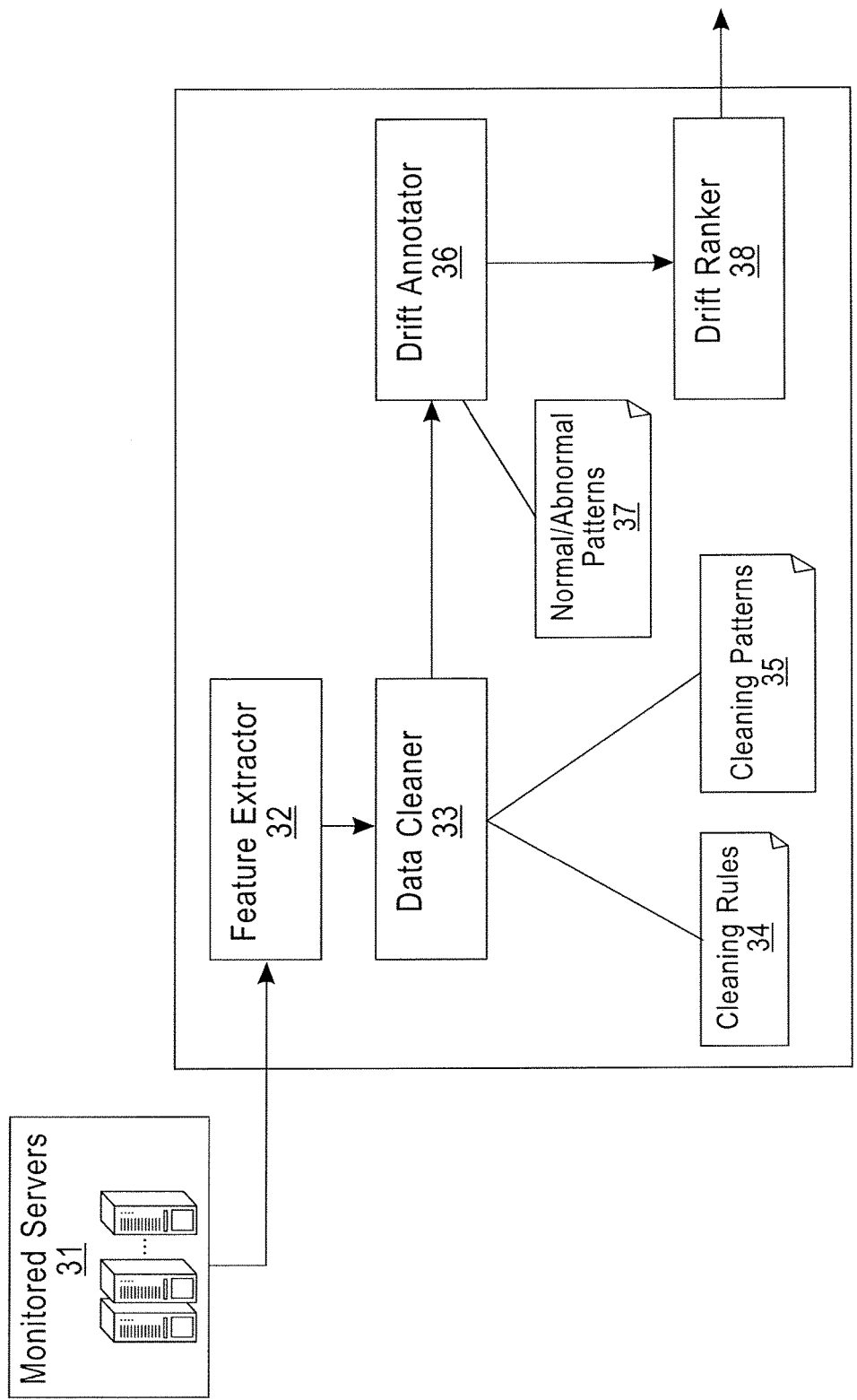
FIG. 3 is a block diagram of a system for automatic diagnosis process according to an embodiment of the disclosure.

FIG. 3 is a block diagram of a system for automatic diagnosis process according to an embodiment of the disclosure. Referring now to the figure, a system for monitoring servers 31 includes a feature extractor module 32 that extracts features, such as change frequencies and change sequences, of changed objects from change records of the servers 31, a data cleaner module 33 to remove irrelevant changes based on the domain independent rules 34 or patterns 35, a drift annotator module 36 to identify the suspicious drifts with normal/abnormal patterns 37, and a drift ranker module 38 to calculate the confidence level based on multiple factors and rank them. Irrelevant changes include adding a new file, accessing a file, and frequently changed objects. The input to the feature extraction module 32 is the state changes $\Delta S$ at time $t_i$ as a set of changes $C_{ij}$, expressed as $\Delta S_{t_i} = \{C_{ij}\}$, $i \in [1, n]$, $j \in [1, m]$, and the k-th error, $E_k$, $k \in [1, K]$. The analysis output from the drift ranker module 38 is a set of suspicious changes $\{SC_l\}$, $l \in [1, L]$, where $SC_l = C_l$, p>, where $C_l$ is the l-th change and p is its rank.

Mathematical Details

A temporal reasoning according to an embodiment of the disclosure follows from the following observations:

Suppose there is a sequence of events that happens over a period of time. At some point in the time interval, there was a transition and the frequency of the events increased. How can it be determined when the transition occurred? In addition, there could be different kinds of changes that triggered the transition. Is there a way to determine which changed triggered the transition. According to an embodiment, it will be assumed that the events are described by a Poisson Model, that is, the probability of the event happening in a time interval $\Delta t$ is $f\Delta t$ where f is the frequency of the event. The transition causes the frequency to change from $f_1$ to $f_2$ and $f_2 > f_1$. A Poisson Model will be used and the parameters of the model will be determined using maximum likelihood. That is, compute the likelihood of the observed sequence of events happening given the model and then adjust the parameters of the model to maximize the likelihood. First, according to an embodiment, assume that there are N events happening over a time interval T. This assumption can be fit to the model by assuming a frequency f for the events. Then, split the interval into a plurality of small intervals of size $\Delta t$ each. The number of such intervals is $T/\Delta t$. In N of these intervals the event happened, and in $T/\Delta t - N$ of these intervals the event did not happen. The likelihood L of an event occurring in an interval $\Delta t$ is:

$$L = (1 - f\Delta t)^{(T/\Delta t - N)}(f\Delta t)^N = \exp(-Tf)(f\Delta t)^N,$$

where the expression has been simplified assuming that $\Delta t$ is small. The frequency can be varied to maximize the likelihood. The log of the likelihood can be differentiated with respect to f to obtain the value off which maximizes the likelihood, $f = N/T$. That is, the likelihood is maximized when the model parameter f is equal to the observed frequency. Now, according to embodiments, assume that a transition occurred at time t, the frequency before this transition was $f_1$, the frequency after the transition was $f_2$, and that $f_1 < f < f_2$. Let n(t) be the number of events before the transition and $N - n(t)$ the number of events after the transition. The time interval before the transition was t and after transition was $T - t$. The likelihood L in terms of the frequencies $f_1, f_2$ can now be expressed as:

$$L = \exp(-tf_1)(f_1\Delta t)^n \times \exp(-(T-t)f_2)(f_2\Delta t)^{(N-n)}, \text{ and}$$

$$L = \exp(-Tf_2)(f_2\Delta t)^N \exp((f_2 - f_1)t)(f_1/f_2)^n.$$

Assuming $f_2 > f_1$, starting at $t=0$, the likelihood will slowly increase as a function of time and will decrease every time an event is encountered, causing n(t) to increase by 1. The likelihood will have this saw tooth pattern and will slowly increase until it reaches a maximum about where the transition occurs. If there is experimental data, this function can be plotted. It is better to plot the log of the likelihood function, since the likelihood can vary by several orders of magnitude, and is always positive. The maximum should be close to where the actual transition occurs. Due to the probabilistic nature of the Poisson process, it will not be exactly where the transition occurs. If instead of trying to determine the time t of the transition, if it is suspected that the transition occurred due to a change, and the time of the change (and hence the transition), its probability and frequency of the events after the change are known, then the same expression can be used to compute the likelihood. If several changes were made at different times and the expected frequency of the events after each change is known, the likelihood for each transition can be computed and the data can be fit to find the change that has the largest likelihood. This will provide a way of determining which change caused the transition or problem.

What can be said if there is only one bad symptom? Suppose there are a few candidates but only one symptom is seen. Again, according to an embodiment, assume there is a Poisson arrival time after a cause to the effect. The average arrival time is not known since there is only one arrival of a symptom. But, the probability distribution of arrival times can be analyzed to draw some useful conclusions. Empirically it would be useful to find for all bugs the probability that their first symptom would come in one hour, two hours, three hours etc. Then, a probability can be assigned to the number of bugs that have an average arrival time of an hour, and a different probability to an arrival time of two hours etc. This could define a mapping, m, from an arrival of t to the probability that a cause has arrival time t. However, even without this mapping, the sum or integral from t=0 to t=infinity is known to be 1. If there is an interval from i to infinity in which that $m(t) \geq 1/t$, then the integral of m(t) from t=0 to infinity will be infinite. Thus, it is known that $m(t)<1/t$ for most of its range. Thus, it is safe to conclude that if there are two candidates who are otherwise equally probable, then the one that happened earlier and hence at a greater temporal distance from the symptom is less likely by at least the ratio of those two distances. In addition, a lower bound can be found for the amount by which the earlier one is less likely than the later candidate to be the real cause by looking at the time that has elapsed since the first symptom was observed. The earliest the next symptom could possibly be observed is that amount of time. Suppose it is assumed for the moment that the average arrival interval is that amount of elapsed time. That average time can be inserted into the two symptom formulas to provide a lower bound on the ratio of the likelihood of the two causes. The upper and lower bound are likely to be quite different. Empirical data can shrink that gap.

System Implementations

It is to be understood that embodiments of the present disclosure can be implemented in various forms of hardware, software, firmware, special purpose processes, or a combination thereof. In one embodiment, an embodiment of the present disclosure can be implemented in software as an application program tangible embodied on a computer readable program storage device. The application program can be uploaded to, and executed by, a machine comprising any suitable architecture. Furthermore, it is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. An automatic troubleshooting system according to an embodiment of the disclosure is also suitable for a cloud implementation.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 4:
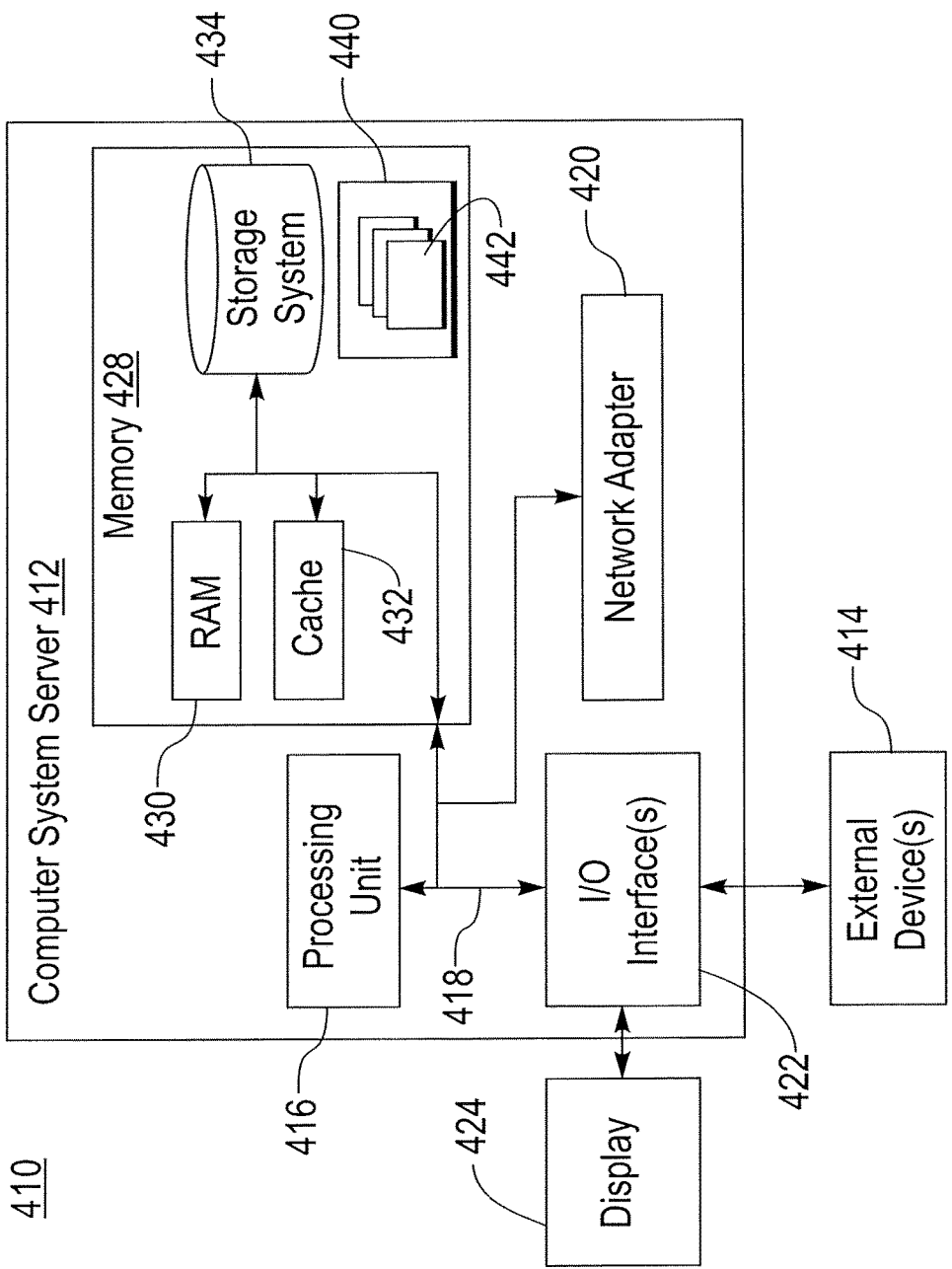
FIG. 4 illustrates a schematic of an example of a cloud computing node according to an embodiment of the disclosure.

Referring now to FIG. 4, a schematic of an example of a cloud computing node is shown. Cloud computing node 410 is only one example of a suitable cloud computing node and is not intended to suggest any limitation as to the scope of use or functionality of embodiments of the disclosure described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the disclosure as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
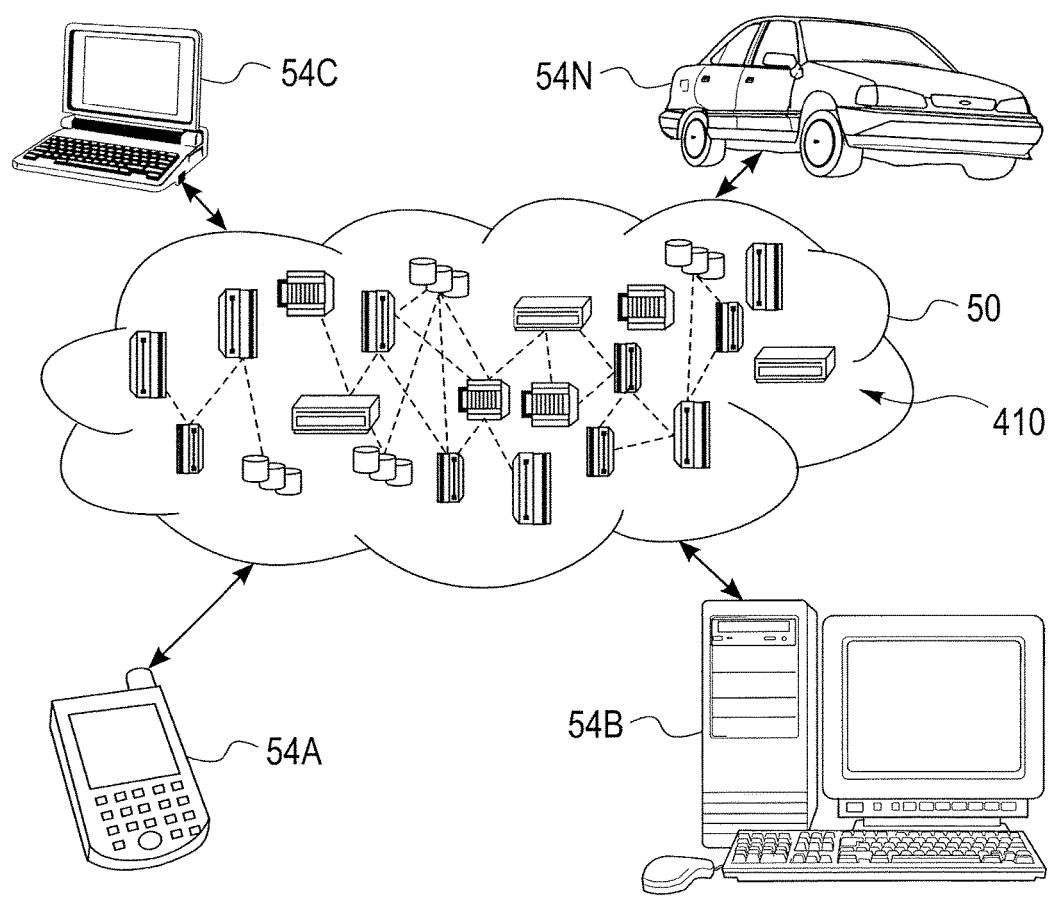
FIG. 5 illustrates a cloud computing environment according to an embodiment of the disclosure.

Referring now to FIG. 5, illustrative cloud computing environment 50 is depicted. As shown, cloud computing environment 50 comprises one or more cloud computing nodes 400 with which local computing devices used by cloud consumers, such as, for example, personal digital assistant (PDA) or cellular telephone 54A, desktop computer 54B, laptop computer 54C, and/or automobile computer system 54N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 900 and cloud computing environment 50 can communicate with any type of computerized device over any type of network and/or network addressable connection (e.g., using a web browser).

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A method for automatically detecting and diagnosing problems in computer system functioning, comprising the steps of:
   receiving a diagnosis time window for computer system monitoring data to be diagnosed;
   determining changed objects by analyzing the computer system monitoring data, including obtaining all changes in the diagnosis time window, identifying a list of changed objects, and extracting features from the list of changed objects, wherein the features include errors sequences and change sequences, wherein the changes include file/directory changes, package changes, operating system configuration changes, and network service changes;
   calculating temporal correlations between problematic behaviors and changes for each changed object;
   identifying and ranking suspicious computer system behavior patterns from the temporal correlations;
   removing irrelevant pattern changes, wherein irrelevant pattern changes include change behavior patterns and change sequence patterns; and
   outputting said ranked suspicious computer system behavior patterns and remediation actions associated with the identified suspicious computer system behavior patterns.

2. The method of claim 1, wherein features further include change frequencies and change densities.

3. The method of claim 1, wherein calculating temporal correlations between problematic behaviors and changes for each changed object comprises:
   obtaining a time of an error or performance anomaly from the computer system monitoring data;
   filtering changes by narrowing the diagnosis time window using the time of the error; and
   for each changed object, fusing the error sequences with the change sequences to generate a change-error sequence, and extracting temporal correlations between errors and changes from the change-error sequence.

4. The method of claim 1, wherein identifying and ranking suspicious computer system behavior patterns from the temporal correlations comprises:
   discovering normal changes and abnormal behavior patterns from the temporal correlations;
   calculating confidence levels of the normal changes and abnormal behavior patterns from the extracted features to identify suspicious behavior patterns; and
   ranking identified suspicious behavior patterns.

5. A non-transitory media fear automatically detecting and diagnosing problems in computer system functioning, comprising;
   a feature extraction module that extracts features, including change frequencies and change sequences, of changed objects from change records of computer system monitoring data of a computer system;
   a data cleaning module that removes irrelevant changes based on domain independent rules or patterns, wherein the irrelevant changes include adding a new file, accessing a file, and frequently changed objects;
   a drift annotation module that identifies suspicious computer system behavior patterns using normal and abnormal patterns; and
   a ranking module that calculates confidence levels of the identified suspicious behavior patterns, ranks said suspicious behavior patterns, and outputs the ranked suspicious behavior patterns and remediation actions associated with the identified suspicious computer system behavior patterns.

6. A non-transitory program storage device readable by a computer, tangibly embodying a program of instructions executed by the computer to perform the method steps for automatically detecting and diagnosing problems in computer system functioning, the method comprising the steps of:
   receiving a diagnosis time window for computer system monitoring data to be diagnosed;
   determining changed objects by analyzing the computer system monitoring data, including obtaining all changes in the diagnosis time window, identifying a list of changed objects, and extracting features from the list of changed objects, wherein the features include errors sequences and change sequences, wherein the changes include file/directory changes, package changes, operating system configuration changes, and network service changes;
   calculating temporal correlations between problematic behaviors and changes for each changed object;
   identifying and ranking suspicious computer system behavior patterns from the temporal correlations;
   removing irrelevant pattern changes, wherein irrelevant pattern changes include change behavior patterns and change sequence patterns; and
   outputting said ranked suspicious computer system behavior patterns and remediation actions associated with the identified suspicious computer system behavior patterns.

7. The computer readable program storage device of claim 6, wherein features further include change frequencies and change densities.

8. The computer readable program storage device of claim 6, wherein calculating temporal correlations between problematic behaviors and changes for each changed object comprises:
   obtaining a time of an error or performance anomaly from the computer system monitoring data;
   filtering changes by narrowing the diagnosis time window using the time of the error; and
   for each changed object, fusing the error sequences with the change sequences to generate a change-error sequence, and extracting temporal correlations between errors and changes from the change-error sequence.

9. The computer readable program storage device of claim 6, wherein identifying and ranking suspicious computer system behavior patterns from the temporal correlations comprises:
  discovering normal changes and abnormal behavior patterns from the temporal correlations;
  calculating confidence levels of the normal changes and abnormal behavior patterns from the extracted features to identify suspicious behavior patterns; and
  ranking identified suspicious behavior patterns.

* * * * *